United States Patent
Nam

(10) Patent No.: US 9,718,338 B2
(45) Date of Patent: Aug. 1, 2017

(54) VEHICLE DOOR MOLDING STRUCTURE

(71) Applicants: Hyundai Motor Company, Seoul (KR); Kia Motors Corporation, Seoul (KR)

(72) Inventor: Yong Hyun Nam, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/938,070

(22) Filed: Nov. 11, 2015

(65) Prior Publication Data
US 2017/0015183 A1 Jan. 19, 2017

(30) Foreign Application Priority Data
Jul. 14, 2015 (KR) .................. 10-2015-0099876

(51) Int. Cl.
*B60J 10/08* (2006.01)
*B60J 10/88* (2016.01)
*B60J 10/35* (2016.01)

(52) U.S. Cl.
CPC ............... *B60J 10/88* (2016.02); *B60J 10/35* (2016.02)

(58) Field of Classification Search
USPC ...................................... 296/146.9; 49/492.1
See application file for complete search history.

(56) References Cited

U.S. PATENT DOCUMENTS 8,408,622 B2 * 4/2013 Yanai .................... B60R 13/04 296/1.08
2003/0042756 A1 * 3/2003 Ogawa .................. B60J 5/0406 296/146.9

FOREIGN PATENT DOCUMENTS

| DE | 102006062083 | * | 5/2008 |
|----|----|----|----|
| JP | 2006-069229 A | | 3/2006 |
| JP | 4736452 B2 | | 7/2011 |
| JP | 05-278465 B2 | | 9/2013 |
| KR | 10-2005-0097082 A | | 10/2005 |
| KR | 10-2008-0000195 A | | 1/2008 |
| KR | 10-2012-0001312 A | | 1/2012 |
| KR | 10-2014-0055752 A | | 5/2014 |
| KR | 10-2015-0055984 A | | 5/2015 |
| WO | WO2005/056270 | * | 6/2005 |

* cited by examiner

*Primary Examiner* — Dennis H Pedder
(74) *Attorney, Agent, or Firm* — Mintz Levin Cohn Ferris Glovsky and Popeo, P.C.; Peter F. Corless

(57) ABSTRACT

A vehicle door molding structure includes: a variable molding formed integrally along an upper edge of a vehicle door, where a width of the variable molding varies along a length thereof; and an insert molded part connected to an upper part of the variable molding along a height of a vehicle, where a lower part of the variable molding along the height of the vehicle is attached to the vehicle door with adhesion tape.

17 Claims, 8 Drawing Sheets

VEHICLE DOOR MOLDING STRUCTURE

CROSS-REFERENCE TO RELATED APPLICATION

This application claims under 35 U.S.C. §119(a) the benefit of Korean Patent Application No. 10-2015-0099876 filed in the Korean Intellectual Property Office on Jul. 14, 2015, the entire contents of which are incorporated herein by reference.

BACKGROUND (a) Field of the Invention

The present invention relates to a vehicle door molding structure, and more particularly, to a vehicle door molding structure that is installed along an upper edge of the vehicle's rear door and can improve aesthetic appearance.

(b) Description of the Related Art

Conventional vehicle frame doors have a structure in which a door inner panel and a door outer panel combine together to form a door frame structure, and a door frame forming a door window is connected onto the door inner panel and the door outer panel. Such vehicle frame doors are advantageous in terms of weight and cost, but there are drawbacks such as corrosion or deterioration in aesthetic appearance.

Typically, a door molding made of stainless steel is attached to a door frame along an upper edge, in order to improve the aesthetic appearance of the door.

Especially in the case of a rear door, a variable molding, whose width varies along a length of the vehicle, is attached to the upper edge of the door frame, in order to improve the door's aesthetic appearance.

The door frame is typically made of metal in a given shape, and the variable molding is made of stainless steel in a variable shape whose width varies along the length of the vehicle. Thus, the variable molding has an insert molded part made of plastic to connect the variable molding and the door frame, and the insert molded part is bonded to the door frame with adhesion tape.

Also, a door weatherstrip is mounted on the door frame through a lift molding. The shape of the lift molding varies according to variation in the width of the variable molding.

In conjunction with a conventional vehicle door molding structure with an attached variable molding, there is a demand for higher strength for connection between the door frame and the variable molding to prevent the variable molding from coming off or falling out, with the aim of improving and maintaining the aesthetic appearance of the vehicle's door.

The above information disclosed in this Background section is only for enhancement of understanding of the background of the invention and therefore it may contain information that does not form the prior art that is already known in this country to a person of ordinary skill in the art.

SUMMARY

The present invention provides a vehicle door molding structure that is capable of improving the aesthetic appearance of a vehicle door, keeping a variable molding stably attached to a door frame, and achieving weight and cost reductions.

An exemplary embodiment of the present invention provides a vehicle door molding structure including: a variable molding integrally coupled to an upper edge of a vehicle door, wherein a width of the variable molding varies along a length thereof; and an insert molded part connected to an upper part of the variable molding along a height of a vehicle, wherein a lower part of the variable molding along the height of the vehicle may be attached to the vehicle door with adhesion tape.

The vehicle door may include a door frame forming a door window, wherein the variable molding may be connected to the door frame.

The door frame may have a mounting flange that is positioned in an outer side of a width of the vehicle, positioned in an upper part of the height of the vehicle, and extends along the length of the vehicle, wherein the variable molding may be attached to the mounting flange with the adhesion tape.

The door frame may include an upper connecting recess opened upwards along the height of the vehicle, wherein a lift molding may be connected to the upper connecting recess, and a door weatherstrip may be connected to the lift molding. The door frame may include a lower connecting recess opened downwards along the height of the vehicle, a glass run molding may be connected to the lower connecting groove. The glass run molding may have a connecting recess depressed inwards along the width, and the door frame may have a connecting boss that is inserted and connected into the connecting recess.

A lower hook, bent inwards along the width of the vehicle, may be formed integrally on a lower end of the variable molding along the height of the vehicle, and the glass run molding may have a receiving recess where the lower hook is received.

Nonwoven fabric may be attached to the lower hook.

The lower hook may protrude at a protrusion height from a bottom surface of the door frame.

The protrusion height may be preferably 0.2 mm or greater.

A receiving recess for receiving an upper part of the mounting flange may be formed at the bottom of the lift molding along the height of the vehicle, and the receiving recess may include an inner protrusion positioned in an inner side of the width of the vehicle and an outer protrusion positioned in the outer side thereof, wherein the outer protrusion may be shaped like a triangle that becomes narrow downwards along the height of the vehicle.

When the variable molding may be bonded and connected to the door frame, the outer protrusion may overlap the mounting flange.

At least one upper hook may be provided in the upper part of the variable molding along the height of the vehicle and inserted into the insert molded part.

An end piece may be connected to either end of the length of the variable molding and the insert molded part.

The end piece may include: a piece body having a polygonal shape; a hook slot formed at a rear part of the length of the piece body and at a lower part of the height of the piece body; a stopper formed at a rear part of the length of a top edge and protruding upwards along the height of the piece body; and an end rim formed at the rear end of the length of the piece body and sloping upward along the height of the piece body and forwards along the length of the piece body.

A hook may be provided on either end of the length of the variable molding and inserted and connected into the hook slot of the end piece.

When the end piece is connected to the insert molded part, the top edge of the piece body may be inserted and received in the insert molded part, and a bottom edge of the insert molded part along the height of the insert molded part may overlap the top edge.

When the end piece is connected to the insert molded part, the stopper and end rim of the end piece may be in contact with the rear end of the insert molded part, thereby preventing the insert molded part from moving longitudinally.

The lift molding may be assembled to the door frame through one or more water-resistant clips.

Each water-resistant clip may include: a cylindrical clip body; a clip head portion formed at the forepart of the clip body and having a larger diameter than the clip body; and a water-resistant flange extending radially from the clip body to block an assembly hole of the door frame when the water-resistant clip is inserted and fastened into the assembly hole of the door frame.

In a vehicle door molding structure according to an embodiment of the present invention, the variable molding is attached to the door frame with adhesion tape and the lower end of the variable molding along the height of the vehicle is stuck in the door frame. Hence, the variable molding can be kept stably attached to the door frame, thereby preventing the variable molding from coming off or falling out and improving the aesthetic appearance of the vehicle's door.

The variable molding and the insert molded part are combined together, and a plurality of hooks formed on the variable molding increase the strength of connection between the variable molding and the insert molded part, thereby preventing the variable molding and the insert molded part from being separated from each other.

Since the glass run molding fitted into and attached to the door frame has a recess and the door frame to be inserted into the recess has a boss, the strength of connection between the glass run molding and the door frame can be increased. Therefore, the noise, vibration, and harshness (NVH) performance of the vehicle and the aesthetic appearance of the vehicle door can be improved.

A pressure-resistant projection can be formed on the insert molded part for use when the variable molding is inserted into a mold for insertion molding. Therefore, it is possible to avoid surface sinks on the variable molding caused by the mold core, which are produced when the variable molding with which the insert molded part is formed is taken out of the mold.

It is possible to prevent the end piece from falling out because the end piece is connected to both the variable molding and the insert molded part.

Since two opposite ends of the lift molding are assembled to the door frame through water-resistant clips, this prevents corrosion caused by moisture intrusion or the like, thereby improving durability and aesthetic appearance.

Moreover, the reduction in the size of the insert molded part can lead to reductions in weight and cost and improve the overall assemblability of the molding structure.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an exemplary embodiment of the present invention will be described with reference to the accompanying drawings.

Figure 1:
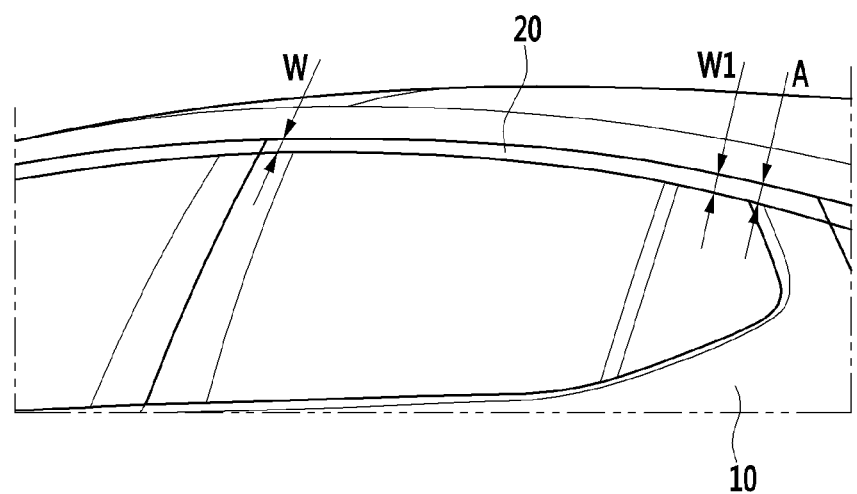
FIG. 1 is a side view of a vehicle door having a vehicle door molding structure according to an exemplary embodiment of the present invention.

Referring to FIG. 1, a vehicle door molding structure according to the exemplary embodiment of the present invention preferably includes a variable molding 20 attached to an upper part of a vehicle door 10.

The variable molding 20 may vary in width along the length of the vehicle. That is, the width W of a front part of the variable molding 20 along the length of the vehicle may be smaller than the width W1 of a rear part thereof.

The width of the variable molding 20 may increase, for example, linearly towards the rear part from the front part.

Such a variable molding 20 may serve to improve the aesthetic appearance of the vehicle door.

Figure 2:
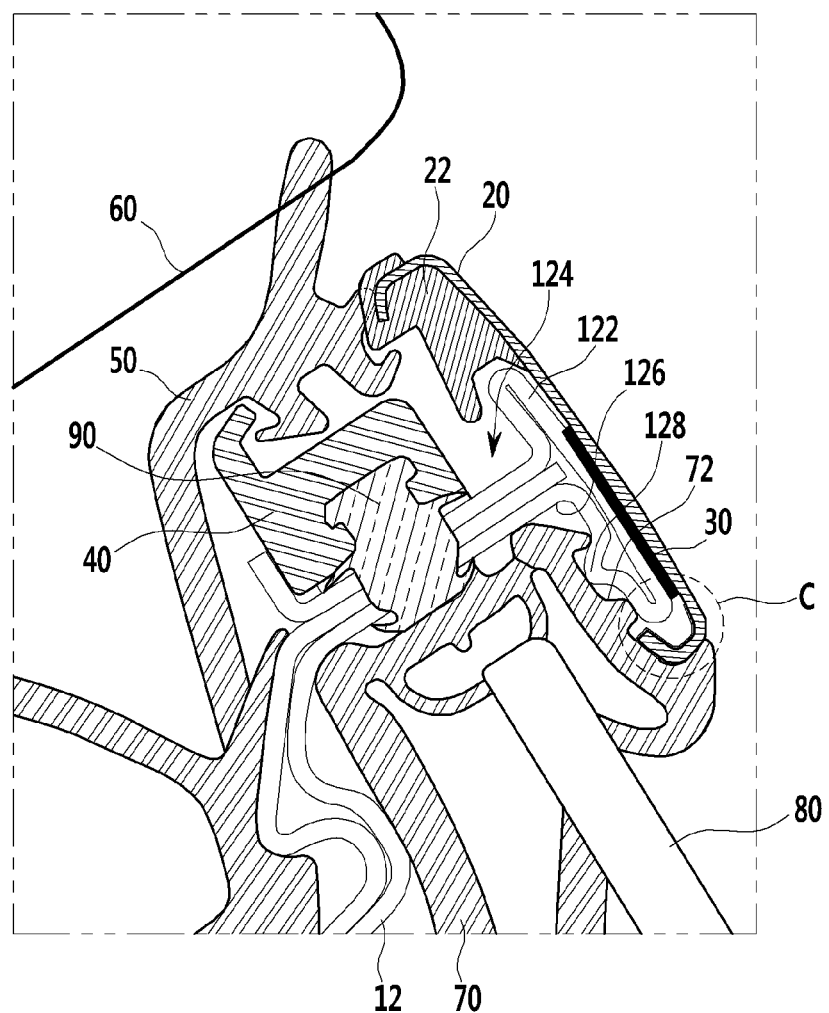
FIG. 2 is a cross-sectional view taken along the line A-A of FIG. 1.

Referring to FIG. 2, the vehicle door 10 may include a door frame 12 forming a door window. The door frame 12 may have a mounting flange 122 with a substantially rectangular shape that is positioned in an outer side of a width of the vehicle, positioned in an upper part of a height of the vehicle, and extends along a length of the vehicle.

The variable molding 20 may be bonded to the mounting flange 122 with adhesion tape 30. The width of the variable molding 20 is larger than the width of the mounting flange 122. When the variable molding 20 is bonded to the mounting flange 122, the mounting flange 122 is bonded to part of an inner side of the variable molding 20.

An upper part of the variable molding 20 along the height of the vehicle may be connected to an insert molded part 22, and a lower part of the variable molding 20 may be bonded to the door frame 12 with adhesion tape 30. The above door frame bonding structure having the variable molding 20 and the adhesion tape 30 can enhance the adhesion of the variable molding 20 to the door frame 12, prevent a reduction in adhesion due to deformation of the insert molded part 22, and improve the workability of the bonding process, as compared with the conventional method in which the adhesive tape 30 is attached to the insert molded part 22 to bond the variable molding 20 to the door frame 12.

The door frame 12 may include an upper connecting recess 124 with a substantially U-shape cross-section, opened upwards along the height of the vehicle, and a lower connecting recess 126 positioned lower than the upper connecting recess 124 along the height of the vehicle and opened downwards along the height of the vehicle.

A lift molding 40 may be connected to the upper connecting recess 124, and a door weatherstrip 50 may be connected to the lift molding 40. The door weatherstrip 50 is placed between a vehicle body 60 and the door 10 when the door 10 is closed, to maintain airtightness between them.

Two opposite ends of the length of the lift molding 40 may be assembled to the door frame 12 through water-resistant clips 90.

A glass run molding 70 may be inserted and connected into the lower connecting recess 126. The glass run molding 70 is in tight contact with a window glass 80 to maintain water resistance and airtightness.

To increase the strength of connection between the glass run molding 70 and the door frame 12, the glass run molding 70 may have a connecting recess 72 depressed inwards along the width, and the door frame 12 facing the connecting recess 72 may have a connecting boss 128 that is inserted and connected into the connecting recess 72.

The connecting recess 72 and the connecting boss 128 may serve to keep the glass run molding 70 in position when the window glass 80 presses against the glass run molding 79 as it is inserted into the glass run molding 70. Also, the connecting recess 72 and the connecting boss 128 may serve to absorb manufacturing tolerance generated during the manufacture of the glass run molding 70 or variable molding 20, and therefore the noise, vibration, and harshness (NVH) performance of the vehicle and the aesthetic appearance of the vehicle door can be improved.

Figure 3:
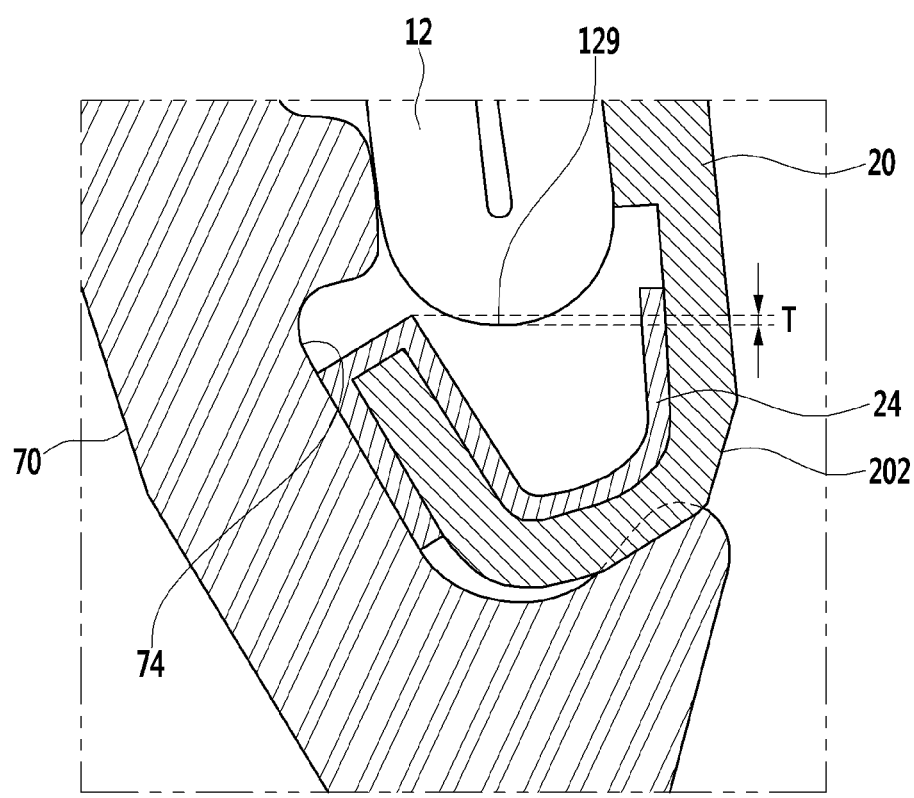
FIG. 3 is an enlarged cross-sectional view of a part C of FIG. 2.

Referring to FIG. 3, a substantially U-shaped lower hook 202, bent inwards along the width of the vehicle, may be formed integrally on a lower end of the variable molding 20 along the height of the vehicle, and the glass run molding 70 may have a receiving recess 74 where the lower hook 202 is received.

Nonwoven fabric 24 may be attached to the lower hook 202 to prevent injury during assembling.

The lower hook 202 protrudes at a protrusion height T from a bottom surface 129 of the mounting flange 122. Thus, when the variable molding 20 is connected to the door frame 12, the lower hook 202 preventing the variable molding 20 from easily falling sideways out of the door frame 12 along the width of the vehicle.

The protrusion height T is preferably 0.2 mm or greater.

Figure 4:
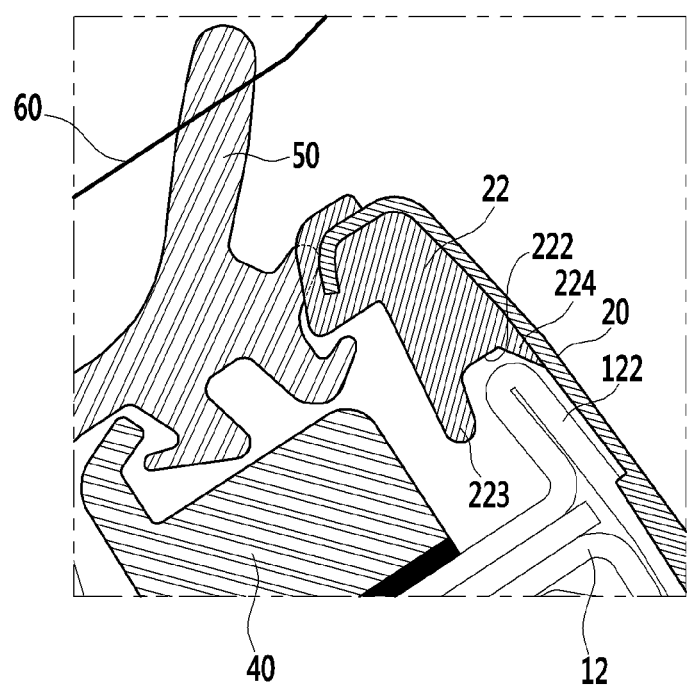
FIG. 4 is an enlarged cross-sectional view of an insert molded part connected to a variable molding according to the exemplary embodiment of the present invention.

Referring to FIG. 4, a receiving recess 222 for receiving an upper part of the mounting flange 122 of the door frame 12 may be formed at the bottom of the lift molding 22 along the height of the vehicle, and the receiving recess 222 may be formed of an inner protrusion 223 positioned in the inner side of the width of the vehicle and an outer protrusion 224 positioned in the outer side thereof.

The outer protrusion 224 may be formed in a substantially triangular shape (i.e., shaped like a triangle) that becomes narrow downwards along the height of the vehicle. When the variable molding 20 is bonded and connected to the door frame 12, the outer protrusion 224 may overlap the mounting flange 122.

Typically, the variable molding 20 made of stainless steel and the insert molded part 22 made of plastic are combined together. To combine the insert molded part 22 and the variable molding 20 together, the variable molding 22 is inserted into an injection mold and held in place. Then, plastic resin is injected into the mold to form the insert molded part 22. Afterwards, when the core is removed to take the variable molding 20 and the insert molded part 22 out of the mold, surface sinks may be produced as the variable molding 20 is pressed against the core. Since the outer protrusion 224 is positioned where the variable molding is pressed against the core, surface sinks on the variable molding 20 can be avoided.

Figure 5:
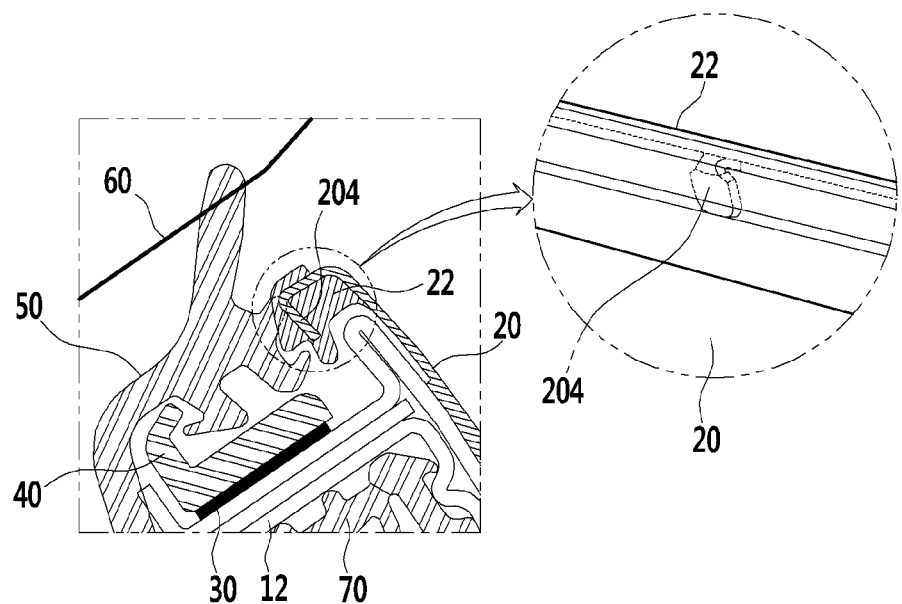
FIG. 5 is a detailed view of a hook of the variable molding according to the exemplary embodiment of the present invention.

Referring to FIG. 5, a substantially U-shaped upper hook 204, bent inwards along the width of the vehicle, may be provided in the upper part of the variable molding 20 along the height of the vehicle.

A plurality of upper hooks 204 may be formed at predetermined intervals along the length of the variable molding 20.

The plurality of upper hooks 204 may be inserted into the insert molded part 22.

The plurality of upper hooks 204 make the variable molding 20 and the insert molded part 22 firmly attached together, thereby preventing the insert molded part 22 and the variable molding 220 from being separated from each other or falling out.

The lift molding 40 may be bonded to the door frame 12 with the adhesion tape 30.

Figure 6:
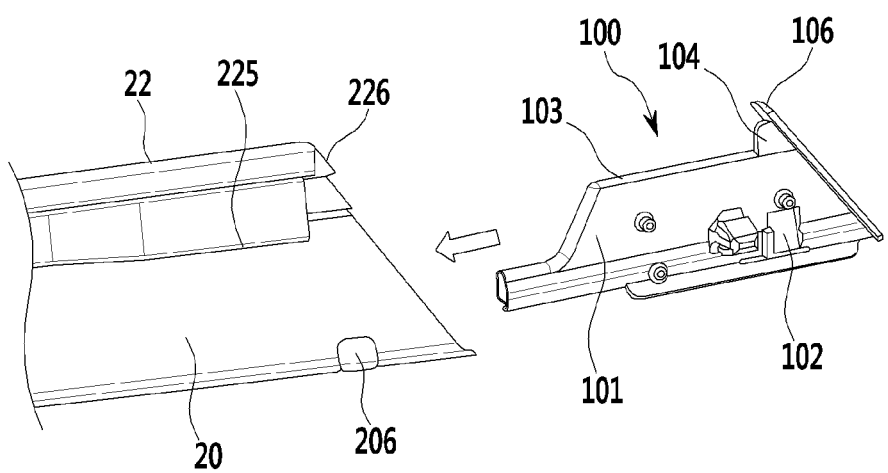
FIG. 6 is an exploded perspective view of an end piece, the variable molding, and the insert molded part according to the exemplary embodiment of the present invention.
Figure 7:
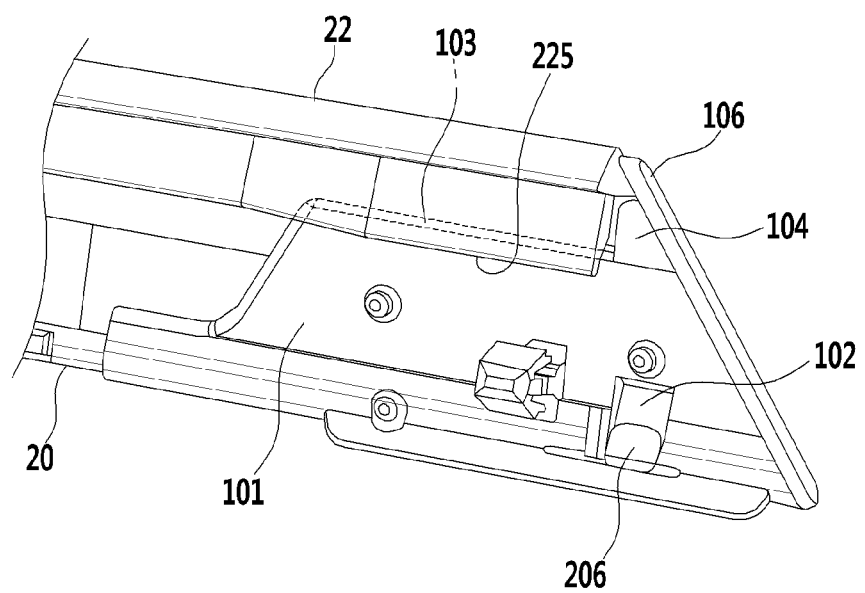
FIG. 7 is an unexploded perspective view of the end piece, the variable molding, and the insert molded part according to the exemplary embodiment of the present invention.

Referring to FIG. 6 and FIG. 7, an end piece 100 may be connected to either end of the length of the variable molding 20 and the insert molded part 22.

The end piece 100 may include a piece body 101 having a polygonal shape, a hook slot 102 formed at a rear part of the length of the piece body 101 and at a lower part of the height of the piece body 10 (preferably, at the same time), a stopper 104 formed at a rear part of the length of a top edge 103 and protruding upwards along the height of the piece body 101, and an end rim 106 formed at the rear end of the length of the piece body 101 and sloping upward along the height of the piece body 101 and forwards along the length of the piece body 101.

A hook 206 may be formed integrally on either end of the length of the variable molding 20 and protrude from them.

With the insert molded part 22 and the variable molding combined together, when the end piece 100 is connected to the rear ends of the variable molding 20 and insert molded part 22, the hook 206 of the variable molding 20 is inserted and connected into the hook slot 102 of the end piece 100, thereby increasing the strength of connection between the end piece 100 and the variable molding 20.

The top edge 103 of the end piece 100 is inserted and received in the insert molded part 22, and a bottom edge 225 of the insert molded part 22 along the height of the insert molded part 22 overlaps the top edge 103, thereby increasing the strength of connection between the insert molded part 22 and the end piece 100 by interlocking.

Moreover, the stopper 104 and end rim 106 of the end piece 100 are in contact with the rear end 226 of the insert molded part 22, thereby preventing the insert molded part 22 from moving longitudinally.

Figure 8:
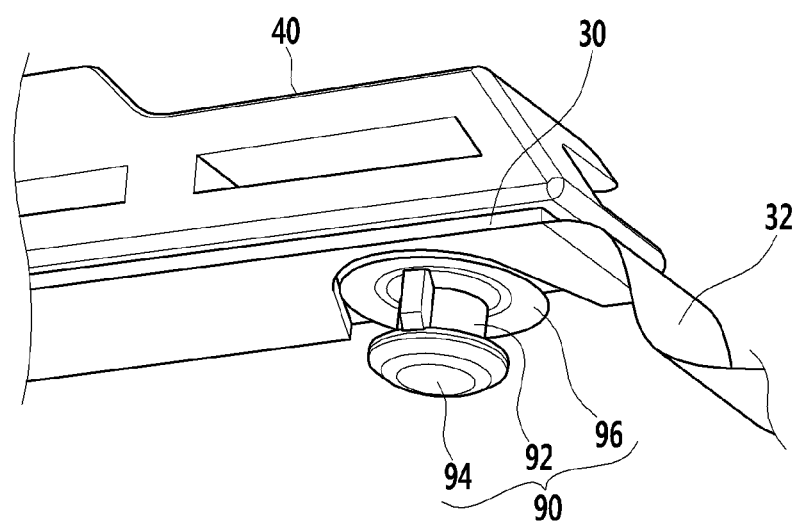
FIG. 8 is a perspective view of a water-resistant clip assembled to a lift molding according to the exemplary embodiment of the present invention.

Referring to FIG. 8, the water-resistant clips 90 are assembled to two opposite ends of or multiple parts of the length of the lift molding 40. Thus, the lift molding 40 may be fastened and supported onto the door frame 12 through the water-resistant clips 90.

Each water-resistant clip 90 may include a cylindrical clip body 92, a clip head portion 94 formed at the forepart of the clip body 92 and having a larger diameter than the clip body 92, and a water-resistant flange 96 extending radially from the clip body 92 to block an assembly hole of the door frame 12 when the water-resistant clip 90 is inserted and fastened into the assembly hole of the door frame 12.

Since the lift molding 40 is bonded to the door frame 12 with the adhesion tape 30 and also fastened to the door frame 12 through multiple water-resistant clips 90, the fastening power is increased. Also, the water-resistant flange 96 prevents the intrusion of foreign materials such as moisture into the assembly hole of the door frame 12. This prevents corrosion of the door frame 12, thereby improving durability and avoiding deterioration in aesthetic appearance. In addition, reference numeral 32 is a release agent coated onto the adhesion tape 30.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A vehicle door molding structure, comprising:
a variable molding integrally coupled to an upper edge of a vehicle door, wherein a width of the variable molding varies along a length thereof;
an insert molded part connected to an upper part of the variable molding along a height of a vehicle; and
an end piece connected to either end of the length of the variable molding and the insert molded part, the end piece comprising:
a piece body having a polygonal shape;
a hook slot formed at a rear part of a length of the piece body and at a lower part of a height of the piece body;
a stopper formed at a rear part of a length of a top edge and protruding upwards along the height of the piece body; and
an end rim formed at a rear end of the length of the piece body and sloping upward along the height of the piece body and forwards along the length of the piece body,
wherein a lower part of the variable molding along the height of the vehicle is attached to the vehicle door with adhesion tape.

2. The vehicle door molding structure of claim 1, wherein the vehicle door comprises a door frame forming a door window, and the variable molding is connected to the door frame.

3. The vehicle door molding structure of claim 2, wherein the door frame has a mounting flange that is positioned in an outer side of a width of the vehicle, positioned in an upper part of the height of the vehicle, and extends along the length of the vehicle, and the variable molding is attached to the mounting flange with the adhesion tape.

4. The vehicle door molding structure of claim 3, wherein the door frame comprises an upper connecting recess opened upwards along the height of the vehicle, a lift molding is connected to the upper connecting recess, and a door weatherstrip is connected to the lift molding.

5. The vehicle door molding structure of claim 2, wherein the door frame comprises a lower connecting recess opened downwards along the height of the vehicle, a glass run molding is connected to the lower connecting groove, the glass run molding has a connecting recess depressed inwards along a width thereof, and the door frame has a connecting boss that is inserted and connected into the connecting recess.

6. The vehicle door molding structure of claim 5, wherein a lower hook, bent inwards along a width of the vehicle, is formed integrally on a lower end of the variable molding along the height of the vehicle, and the glass run molding has a receiving recess where the lower hook is received.

7. The vehicle door molding structure of claim 6, wherein nonwoven fabric is attached to the lower hook.

8. The vehicle door molding structure of claim 7, wherein the lower hook protrudes at a protrusion height from a bottom surface of the door frame.

9. The vehicle door molding structure of claim 8, wherein the protrusion height is 0.2 mm or greater.

10. The vehicle door molding structure of claim 4, wherein a receiving recess for receiving an upper part of the mounting flange is formed at the bottom of the lift molding along the height of the vehicle, the receiving recess comprises an inner protrusion positioned in an inner side of the width of the vehicle and an outer protrusion positioned in the outer side thereof, and the outer protrusion is shaped like a triangle that becomes narrow downwards along the height of the vehicle.

11. The vehicle door molding structure of claim 10, wherein, when the variable molding is bonded and connected to the door frame, the outer protrusion overlaps the mounting flange.

12. The vehicle door molding structure of claim 3, wherein at least one upper hook is provided in the upper part of the variable molding along the height of the vehicle and inserted into the insert molded part.

13. The vehicle door molding structure of claim 1, wherein a hook is provided on either end of the length of the variable molding and inserted and connected into the hook slot of the end piece.

14. The vehicle door molding structure of claim 1, wherein
   when the end piece is connected to the insert molded part,
      the top edge of the piece body is inserted and received in the insert molded part, and
   a bottom edge of the insert molded part along the height of the insert molded part overlaps the top edge.

15. The vehicle door molding structure of claim 1, wherein, when the end piece is connected to the insert molded part, the stopper and end rim of the end piece are in contact with the rear end of the insert molded part, thereby preventing the insert molded part from moving longitudinally.

16. The vehicle door molding structure of claim 4, wherein the lift molding is assembled to the door frame through one or more water-resistant clips.

17. The vehicle door molding structure of claim 16, wherein each water-resistant clip comprises:
   a cylindrical clip body;
   a clip head portion formed at the forepart of the clip body and having a larger diameter than the clip body; and
   a water-resistant flange extending radially from the clip body to block an assembly hole of the door frame when the water-resistant clip is inserted and fastened into the assembly hole of the door frame.

\* \* \* \* \*